United States Patent [19]

Stewart, Jr.

[11] 3,725,774

[45] Apr. 3, 1973

[54] APPARATUS FOR MEASURING ELECTRICAL ENERGY CONSUMPTION

[75] Inventor: Victor E. Stewart, Jr., South Milwaukee, Wis.

[73] Assignee: McGraw-Edison Company, South Milwaukee, Wis.

[22] Filed: Feb. 24, 1971

[21] Appl. No.: 118,295

[52] U.S. Cl. ............................................... 324/142
[51] Int. Cl. ............................................ G01r 21/00
[58] Field of Search ..................... 324/140, 141, 142

[56] References Cited

UNITED STATES PATENTS 3,068,411  12/1962  Galman ............................... 324/142
3,343,084  9/1967  Gambale et al. .................. 324/142 X
2,829,343  4/1958  Miller ................................... 324/142

FOREIGN PATENTS OR APPLICATIONS 441,785  7/1965  Japan ................................... 324/142

Primary Examiner—Alfred E. Smith
Attorney—R. J. Falkowski

[57] ABSTRACT

A current transformer is connected to an electrical power circuit to provide a measure of the current in the power circuit. The current measure is applied through a reversing switch and a diode rectifying bridge to a coulombmeter and is controlled by commutating the bridge with a voltage from a voltage transformer connected to the electrical power circuit. The connections are made to apply current to the coulombmeter during the portion of the current cycle that occurs during a selected voltage half-cycle. The current measure is further controlled by a modulating circuit connected to respond to the voltage of the power circuit and to modulate the current as a function of voltage level. A control means responds to a selected condition of the coulombmeter to reverse the control current connections to the coulombmeter. A reading means senses the number of reversal operations to thereby provide an indication of the total amount of energy consumed in the power circuit over a selected period.

34 Claims, 4 Drawing Figures

INVENTOR.
VICTOR E. STEWART
BY
ATTORNEY

APPARATUS FOR MEASURING ELECTRICAL ENERGY CONSUMPTION

This invention relates to electrical power measuring systems and methods, particularly to static watt-hour meter systems methods for measuring energy consumption in an alternating electrical power circuit.

The measurement of electrical energy consumed in alternating current power circuits presently is usually accomplished with standard induction type watt-hour meters. Static watt-hour meters using relatively recently developed semiconductor electronic components, such as transistors and diodes, are generally recognized as having many better characteristics than induction meters. However, static watt-hour meters produced have been relatively expensive, relatively unreliable, and difficult to calibrate. With this invention, however, a static watt-hour meter is provided that is highly reliable, relatively inexpensive, and readily adaptable to reading by modern computer-type accounting systems.

According to this invention a current proportional to the current in an alternating electrical power circuit is rectified and applied to a current measuring and integrating device. The current applied to the measuring device is continuously modified as a function of the phase relationship between the voltage and current, thereby automatically compensating for the phase angle between voltage and current. If desired, the current to the measuring device may be modulated as a function of the voltage level so that an accurate indication accounting for current, phase angle, and voltage is provided. A coulombmeter is used that accurately indicates total charge received which is proportional to energy consumed in the power circuit. The charge received is sensed and the current reversed when the coulombmeter has reached its storage capacity in one direction to charge the coulombmeter in an opposite direction. The total reversals are recorded to provide an indication of total power consumed by the power circuit over a selected period of time.

Other objects and advantages of this invention will be apparent from the following detailed description.

Figure 1:
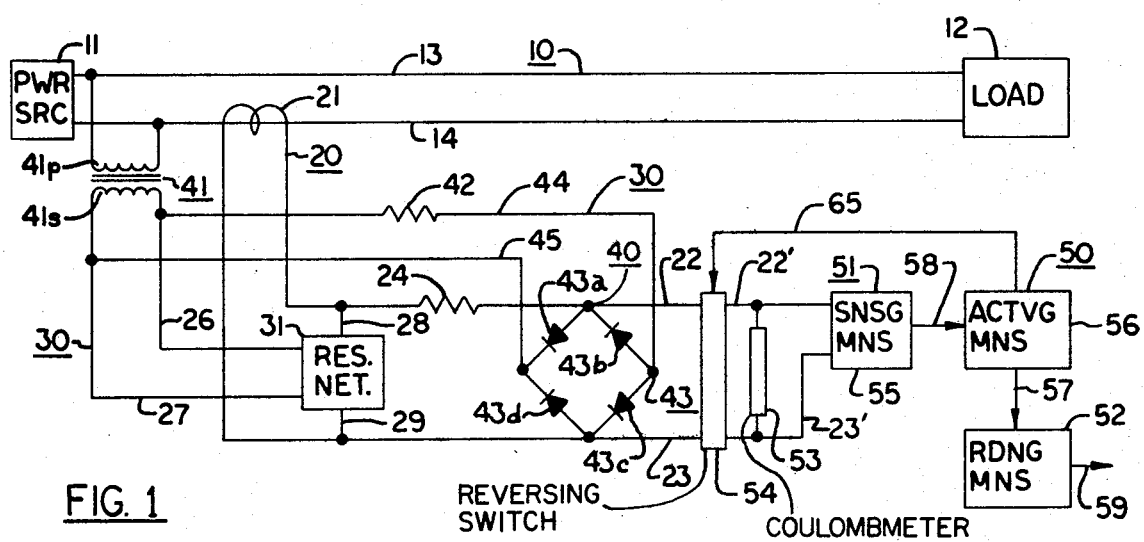
FIG. 1 is a schematic and block diagram of a system according to this invention.

Referring to FIG. 1, an electrical power circuit 10 comprises an electrical power source 11 and a load 12 connected to the power source by conductors 13 and 14. An alternating electrical energy measuring system for measuring the electrical energy consumed by load 12 comprises a power sensing means for producing an output having an electrical energy level varying as a function of the electrical power consumed by load 12. The power sensing means comprises a current means 20 responsive to the current in power circuit 10 for producing a control current varying as a function of the power circuit current, a phase angle means 40 responsive to the voltage in electrical circuit 10 for modifying the control current as a function of the phase angle between the voltage and current of power circuit 10, and a voltage means 30 responsive to the voltage in power circuit 10 for modifying the control current as a function of the power circuit voltage. The output from the power sensing means is applied to a recording means 50 for reading and indicating the total energy consumed by power circuit 10.

Referring to FIG. 1, current means 20 comprises a current transformer 21 connected to sense the current in conductor 14 and load 12. The characteristics of current transformer 21 are selected to provide a control current at a level desirable for the circuit components at the anticipated currents of the power circuit. The current means is responsive to the current in the electrical power circuit to produce a control current varying as a function of the power circuit current and at a selected phase angle to the power circuit current. In typical applications the control current is proportional to and substantially in phase with the power circuit current. The control current is delivered to recording means 50 along conductors 22 and 23 through a resistor 24.

The control current is modified by phase angle means 40 to compensate for any difference in phase angle between the voltage and current in power circuit 10. The phase angle means comprises a voltage transformer 41 having a primary winding 41p connected between conductors 13 and 14 and a secondary output winding 41s. Voltage transformer 41 is selected to produce a phase control voltage at a level varying as a function of the power circuit voltage and at a preselected phase angle relative to the voltage in circuit 10. In typical applications the control voltage is substantially proportional to and substantially in phase with the electrical circuit voltage and at a level selected to provide reliable operation of the system. The phase angle means also comprises a resistor 42 and a rectifying bridge 43 comprising diodes 43a, 43b, 43c and 43d connected to voltage transformer 41 with conductors 44 and 45.

Figure 4:
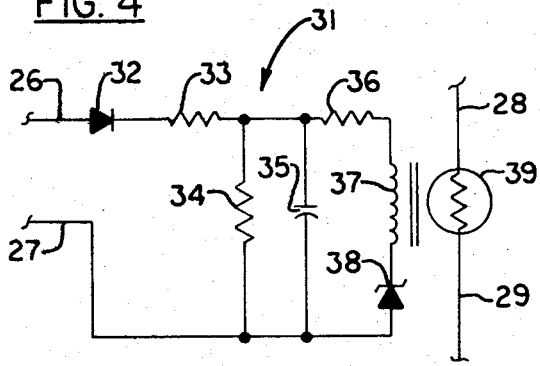
FIG. 4 is a schematic of a portion of the system shown in FIG. 1.

Voltage means 30 is connected to the power circuit to obtain a level control voltage varying as a function of the voltage level in the power circuit from voltage transformer 41. The voltage measuring means modifies or modulates the control current as a function of the power circuit voltage in response to the level control voltage which appears at secondary winding 41s. Voltage means also comprises a means for shunting the control current comprising a resistor network 31, or similar device known in the art, connected to transformer 41, that provides a shunt resistance varying as a function of the level control voltage. Referring to FIG. 4, resistance network 31 comprises a voltage averaging circuit connected to conductors 26 and 27, a magnetic core 37, and a magnetoresistor 39 connected between conductors 28 and 29 and positioned in the magnetic flux field of core 37. The filter averaging circuit provides a flux in core 37 that varies as a function of the average of the control voltage received from transformer 41. The filter circuit comprises a diode 32 that rectifies the alternating input, resistors 33, 34 and 36 and a capacitor 35 that filter and average the rectified alternating input and a Zener diode 38 that limits the range of variations in flux to levels provided at a voltage above the breakdown voltage of Zener diode 38.

Figure 3:
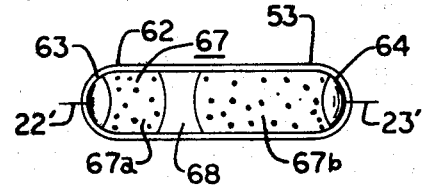
FIG. 3 is a side view of a coulombmeter of a type that may be utilized with the circuit shown in FIG. 1.

Recording means 50 comprises a measuring means 51 for indicating electrical energy received and a reading means 52 for reading the total electrical energy received by the measuring means. The measuring means comprises an energy storage and integrating means, that may be a measuring or current integrating device, such as a mercury plating cell or coulombmeter 53, and a control means for sensing the indication provided by coulombmeter 53 and for controlling the polarity of the control current connection. The control means comprises a means for reversing the direction of the control current applied to coulombmeter 53, such as a reversing switch 54; a sensing means 55 for sensing the indication produced by coulombmeter 53; and an activating means 56 for operating reversing switch 54, as shown by line 65, and for providing an output to the reading means, as shown by line 57 upon receipt of an indication by sensing means 55, as shown by line 58. Coulombmeter 53 may be any suitable device that integrates current as a function of time, for example, a mercury plating cell coulombmeter 53' as shown in FIG. 3 or a capacitor. Reading means 52 may be of any type known in the art that could comprise a counter or similar device for indicating the number of reversals of current applied to coulombmeter 53 indicated by activating means 56 to provide an appropriate readout output, as shown by line 59.

Referring to FIG. 3, coulombmeter 53' is a mercury plating cell of a type commercially available and comprises a sealed glass envelope 62, electrodes 63 and 64, typically of a nonreactive metal such as platinum, connected to conductors 22' and 23', respectively. A mercury plating cell 67 is enclosed within envelope 62 and has a mercury section 67a and a mercury section 67b separated by an electrolyte section 68, using any suitable electrolyte such as a mercuric iodide salt solution. As current is applied to the cell the mercury is moved from one mercury section to the other as a function of current level and direction in a manner known in the art.

Referring to FIG. 1, with a coulombmeter as shown in FIG. 3, sensing means 55 senses the potential across coulombmeter 53 by sensing the potential between conductors 22' and 23' in any manner known in the art. When mercury has been substantially removed from one mercury section, the potential across coulombmeter 53 rises significantly, and the sensing means senses this increased potential in any manner known in the art and produces an output signal to activating means 56. The activating means responds to the voltage indication to reverse the polarity of the connections along conductors 22' and 23' by operating reversing switch 54, which may be any known controllable double-pole, double-throw switch, as shown by line 65. In addition, reading means 52 responds to an activating means output as shown by line 57 to indicate in some readout form known in the art along line 59, either by counting or other means, the fact that one selected unit of electrical energy has been consumed as indicated by the transfer of mercury in the mercury cell from one mercury section to the other.

Figure 2:
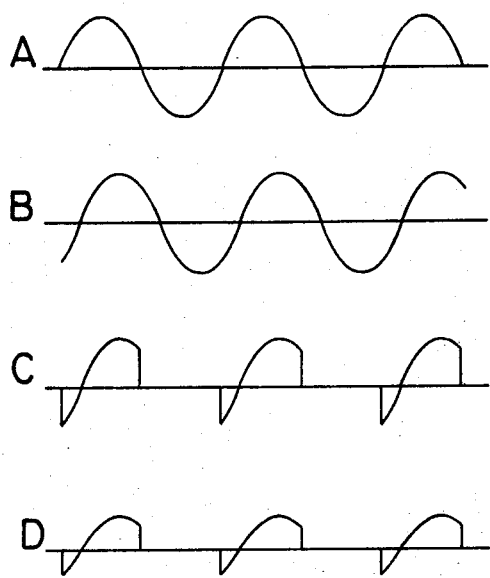
FIG. 2 is a graph of four wave forms that may occur during the operation of the system shown in FIG. 1.

In the operation of the circuit shown in FIG. 1, the control current is applied from current transformer 21 to recording means 50 as controlled by rectifying bridge 43. Referring to FIG. 2, FIG. 2B shows a typical control current wave form of current to reversing switch 54 without modification. Since the current is alternating, no charge would accumulate on coulombmeter 53 because the polarity is reversed every cycle. However, by controlling bridge 43 with the phase control voltage from secondary winding 41s of transformer 41, bridge 43 acts as a short circuit to the control current whenever bridge 43 is forward biased by the phase control voltage. When the voltage at conductor 44 is positive relative to conductor 45, bridge 43 is forward biased and no control current is passed to coulombmeter 53. The polarity relationship of the voltage of secondary winding 41s and current transformer 21 determines which direction of control current is passed to coulombmeter 53 when the voltage and current are in phase.

Assuming a phase control voltage wave form as shown in FIG. 2A and a control current wave form as shown in FIG. 2B lagging the voltage by about 30°, control current is applied to the coulombmeter only during the positive half cycle of the phase control voltage as shown in FIG. 2A. With the control voltage out of phase with the control current, an automatic compensation for the phase angle, and thus actual energy consumed, is made since energy consumed is equal to the product of the voltage, current and the cosine of the phase angle. The net electrical current received by and passed through the coulombmeter, as shown in FIG. 2C, is the current during the positive portion of the current wave form shown in FIG. 2C minus the negative portion. This portion varies as a function of the product of the voltage, current, and cosine of the phase angle, and thus permits easy calibration of the meter system. When the phase control voltage and control current are in phase, rectifying bridge 43 conducts during the positive half-cycle of the voltage and the total half-cycle control current is applied to coulombmeter 53. As the control phase angle changes the commutation on rectifier bridge 43 changes and current flows for a portion of the current cycle in one direction and during the remainder in the other direction, thereby automatically compensating for the actual energy consumed.

In a constant voltage system the circuit without additional control would operate satisfactorily to provide an accurate indication of energy consumed. However, because of possible significant voltage variations, voltage means 30 shunts a selected portion of the control current to vary the control current applied to coulombmeter 53 as a function of the load circuit voltage level. Voltage means 30 produces a level control voltage at secondary winding 41s of transformer 41 and applies it to shunt resistance network 31. Resistive network 31 produces a shunt resistance that varies as a function of the control voltage in that, as the control voltage increases, the resistance across network 31 increases, thereby applying a greater portion of the control current through resistor 24 to coulombmeter 53. Network 31 responds to an average of the control voltage as provided by the filter averaging circuit and varies the resistance of magnetoresistor 39 as a function of average control voltage. Referring to FIG. 2, a circuit of the type shown at a selected voltage level could reduce the control current as shown in FIG. 2C to a level shown in FIG. 2D.

I claim:

1. An alternating electrical power measuring system for measuring the electrical energy consumed by an electrical load comprising:

a current means responsive to the load current for producing a control current varying as a function of said load current;

a recording means connected to receive the control current for measuring net electrical current received and for producing an indication when said net current received reaches a preselected level; and a phase angle means responsive to the load voltage for controlling the control current from the current means to the recording means to apply said control current to said recording means substantially only during preselected portions of each phase of said load voltage.

2. An alternating electrical power measuring system according to claim 1 also comprising a voltage means responsive to the load voltage for controlling the control current to vary said control current applied to the recording means as a function of said load voltage.

3. An alternating electrical power measuring system according to claim 1 wherein said phase angle means comprises means for controlling the control current to apply said control current to the recording means only during half cycles of one polarity of the load voltage.

4. An alternating electrical power measuring system according to claim 1 wherein said current means is a current means responsive to the load current for producing a control current substantially proportional to said load current.

5. An alternating electrical power measuring system according to claim 4 also comprising a voltage means responsive to the load voltage for controlling the control current to vary said control current applied to the recording means substantially proportionally to said load voltage.

6. An alternating electrical power measuring system according to claim 4 wherein said recording means comprises a measuring means connected to receive the control current for measuring net electrical current received and for producing the indications, and a reading means responsive to said indications to indicate the total electrical current received by said measuring means over a selected period of time.

7. An alternating electrical power measuring system according to claim 6 wherein said measuring means comprises a coulombmeter having a two polarity predetermined storage capacity.

8. An alternating electrical power measuring system according to claim 7 wherein said recording means also comprises a reversing means for reversing the direction of said control current applied to the coulombmeter, and a sensing means responsive to the storage level of said coulombmeter to effect operation of the reversing means when said coulombmeter reaches a storage level substantially equal to the predetermined storage capacity of said coulombmeter.

9. An alternating electrical power measuring system according to claim 8 wherein said recording means comprises a measuring means for measuring electrical current connected to receive the control current to produce an indication of current received, and a reading means responsive to the indication of the measuring means for indicating the electrical current measured by said measuring means over a period of time.

10. An alternating electrical power measuring system according to claim 6 wherein said measuring means comprises a plating cell having a predetermined storage capacity and an increased internal resistance upon substantially reaching said storage capacity.

11. An alternating electrical power measuring system according to claim 10 wherein said recording means also comprises a reversing means for reversing the polarity of said control current applied to the plating cell, and a sensing means responsive to the voltage across said plating cell to effect operation of the reversing means when said plating cell voltage reaches a preselected level.

12. An alternating electrical power measuring system according to claim 4 wherein said recording means comprises an electrical energy measuring device having a predetermined storage capacity, an activating means for reversing the direction of control current applied to said measuring device, a sensing means responsive to the level of storage of said measuring device for operating said activating means when said level reaches said storage capacity of said storage device, and a reading means responsive to operation of said activating means for producing an indication of the total number of said reversing operations over a selected period of time.

13. An alternating electrical power measuring system according to claim 4 wherein said phase angle means comprises means for controlling the flow of the control current to apply said control current to the recording means only during half cycles of one polarity of the load voltage.

14. An alternating electrical power measuring system according to claim 4 wherein said current means comprises a current transformer having an output winding coupled to the electrical load to produce the control current at its output winding.

15. An alternating electrical power measuring system according to claim 4 also comprising a means responsive to the load voltage for producing a level control voltage, and a means responsive to said level control voltage for modulating the control current to apply said control current to the recording means at a level varying as a direct function of said level control voltage.

16. An alternating electrical power measuring system according to claim 15 wherein said phase angle means comprises a means responsive to the load voltage for producing a control voltage having a preselected phase relationship to said load voltage, and a means for controlling the flow of said control current from the current means to the recording means to apply said control current to said recording means substantially only during preselected portions of each phase of said control voltage.

17. An alternating electrical power measuring system according to claim 16 also comprising a voltage means responsive to the load voltage for modulating the control current to vary the control current applied to the recording means at a rate varying as a direct function of said load voltage.

18. An alternating electrical power measuring system for measuring the electrical energy consumed by an electrical load comprising:

a current means responsive to the load current for producing a control current substantially proportional to said load current and having a predetermined phase relationship to said load current;

a means connected to receive the control current for measuring electrical current received;

a transforming means responsive to the load voltage for producing a control voltage substantially proportional to said load voltage and having a predetermined phase relationship to said load voltage;

a voltage means responsive to the control voltage for modulating the control current to apply the control current to the measuring means at a rate substantially proportional to said control voltage; a phase modulating means responsive to the control voltage for controlling the flow of said control current from the current means to the measuring means to apply said control current to said measuring means substantially only during selected half cycles of a selected polarity of said control voltage; and a reading means responsive to the level of electrical current measured by the measuring means for indicating the electrical current measured by said measuring means.

19. An alternating electrical power measuring system according to claim 18 wherein said current means comprises a current transformer having an output winding coupled to the electrical power circuit to produce the control current at said output winding.

20. An alternating electrical power measuring system according to claim 19 wherein said phase modulating means comprises a rectifying bridge connected to shunt the control current and to receive the control voltage as a shunt control input.

21. An alternating electrical power measuring system according to claim 20 wherein said voltage means comprises a controllable resistance circuit connected to shunt control current at a level varying as an indirect function of the control voltage level.

22. A method of determining the electrical energy consumed in an electrical power circuit comprising:

sensing the current in the power circuit and producing a control current proportional to said power circuit current;

applying the control current to an electrical current measuring device capable of measuring electrical current;

sensing the phase of the voltage in the power circuit; and modulating the control current by passing control current to the measuring device only during selected portions of each cycle of the power circuit voltage.

23. A method according to claim 21 also comprising sensing the power circuit voltage level and further modulating the control current to pass control current to the measuring device at a rate proportional to the voltage level.

24. A method according to claim 21 also comprising reversing the polarity of the control current applied to the measuring device whenever the measuring device has reached a preselected measuring capacity.

25. An alternating electrical power measuring system for measuring the electrical energy consumed by an electrical load comprising:

a current means responsive to the load current for producing a control current varying as a function of said load current;

a recording means connected to receive the control current for measuring electrical current;

a phase angle means responsive to the load voltage for controlling the control current from the current means to the recording means to apply said control current to said recording means substantially only during preselected portions of each phase of said load voltage; and a voltage means responsive to the load voltage for controlling the control current to vary said control current applied to the recording means as a function of said load voltage.

26. An alternating electrical power measuring system according to claim 25 wherein said phase angle means comprises a means responsive to the load voltage for producing a control voltage having a preselected phase relationship to said load voltage, and a means for controlling the flow of said control current from the current measuring means to the recording means to apply said control current to said recording means substantially only during preselected portions of each cycle of said control voltage.

27. An alternating electrical power measuring system according to claim 25 wherein said current means is a current means responsive to the load current for producing a control current substantially proportional to said load current; and wherein said voltage means is a voltage means responsive to the load voltage for controlling the control current to vary said control current applied to the recording means substantially proportionally to said load voltage.

28. An alternating electrical power measuring system according to claim 27 wherein said voltage means comprises a first means connected to the load voltage for producing a level control voltage, and a second means responsive to said level control voltage level for modulating the control current as a function of said level control voltage.

29. An alternating electrical power measuring system according to claim 27 wherein said voltage means comprises a first means responsive to the load voltage for producing a level control voltage, and a second means responsive to said level control voltage for controlling the control current to produce a control current substantially proportional to said level control voltage.

30. An alternating electrical power measuring system according to claim 29 wherein said second means comprises a controllable shunting circuit connected to vary the control current by selectively shunting a portion of said control current as an indirect function of the level control voltage.

31. An alternating electrical power measuring system according to claim 27 wherein said recording means comprises a measuring device having a predetermined maximum storage capacity indicating a predetermined level of electrical current received, a reversing means for reversing the polarity of control current applied to said measuring device, a sensing means responsive to an indication of the measuring device that said maximum storage capacity has been reached, an activating means responsive to the sensing means for operating the reversing means when said sensing means indicates that said measuring device has reached said maximum storage capacity, and a reading means responsive to operation of said activating means for counting the number of said reversing operations to thereby indicate the total net electrical current received by the measuring device over any selected period of time.

32. An alternating electrical power measuring system according to claim 31 wherein said voltage means comprises a first means connected to the load voltage for producing a level control voltage, and a second means responsive to said level control voltage level for modulating the control current as a function of said level control voltage.

33. An alternating electrical power measuring system according to claim 32 wherein said second means comprises a controllable shunting circuit connected to shunt the control current as a function of the level control voltage.

34. An alternating electrical power measuring system according to claim 32 wherein said phase angle means comprises a first means responsive to the load voltage for producing a control voltage having a preselected phase relationship to said load voltage, and a second means for controlling the flow of said control current from the current means to the recording means to apply said control current to said recording means substantially only during preselected portions of each phase of said control voltage.

* * * * *